(12) United States Patent
Kawase et al.

(10) Patent No.: US 6,632,024 B2
(45) Date of Patent: Oct. 14, 2003

(54) OPTICAL INTERCONNECTION APPARATUS

(75) Inventors: Ritsu Kawase, Shizuoka (JP); Kyouichi Sasaki, Shizuoka (JP); Tatsushi Kobayashi, Shizuoka (JP); Takashi Yoshida, Tokyo (JP); Mamoru Hirayama, Tokyo (JP)

(73) Assignees: Nippon Telegraph and Telephone Corporation, Tokyo (JP); Tomoegawa Paper Co., Ltd., Tokyo (JP)

( * ) Notice: Subject to any disclaimer, the term of this patent is extended or adjusted under 35 U.S.C. 154(b) by 0 days.

(21) Appl. No.: 09/940,543

(22) Filed: Aug. 29, 2001

(65) Prior Publication Data

US 2002/0054739 A1 May 9, 2002

(30) Foreign Application Priority Data

Aug. 29, 2000 (JP) ......................................... 2000-259742

(51) Int. Cl.⁷ ............................ G02B 6/38; G02B 6/36; D02G 3/00
(52) U.S. Cl. ............................ 385/59; 385/76; 385/78; 385/92; 428/375; 428/378
(58) Field of Search .............................. 385/59, 76, 78, 385/92; 428/375, 378

(56) References Cited

U.S. PATENT DOCUMENTS

| | | | | |
|---|---|---|---|---|
| 4,896,940 A | * | 1/1990 | Kathiresan et al. | ......... 385/112 |
| 5,452,392 A | * | 9/1995 | Baker et al. | ................... 385/92 |
| 5,915,056 A | * | 6/1999 | Bradley et al. | ................ 385/76 |
| 5,981,064 A | | 11/1999 | Burack et al. | |
| 6,303,742 B1 | * | 10/2001 | Okada et al. | ................ 528/353 |
| 6,414,059 B1 | * | 7/2002 | Kobayashi et al. | ......... 524/101 |
| 6,435,731 B1 | * | 8/2002 | Yamaguchi et al. | .......... 385/78 |

FOREIGN PATENT DOCUMENTS

| | | |
|---|---|---|
| EP | 0 587 336 | 3/1994 |
| EP | 0 799 693 | 10/1997 |
| EP | 1 067 418 A1 | 1/2001 |
| GB | 2 297 058 | 7/1996 |
| JP | 07-281052 | 10/1995 |
| WO | WO99/46621 | 9/1999 |

OTHER PUBLICATIONS

WO99/46621, published Sep. 16, 1999 with EP 1 067 418, published Jan. 10, 2001.

* cited by examiner

Primary Examiner—Brian Healy
Assistant Examiner—Tina M Lin
(74) Attorney, Agent, or Firm—Arent Fox Kintner Plotkin & Kahn PLLC

(57) ABSTRACT

An optical interconnection apparatus comprises an adhesive layer having a 2-dimensional plane, and optical fibers secured on the adhesive layer. The optical fibers are routed on the adhesive layer so as to have at least one of an intersection portion, a bent portion, and a changing portion of fiber pitch, and to have a end portion outwardly projecting from the adhesive layer. The projecting end portion is used for optical interconnection. At least a portion of the circumferential edge surface of the adhesive layer is covered by a flame resistant material at an end of the optical fiber and in the vicinity thereof.

20 Claims, 3 Drawing Sheets

OPTICAL INTERCONNECTION APPARATUS

BACKGROUND OF THE INVENTION

1. Technical Field

The present invention relates to improvement of optical interconnection apparatuses (optical circuit boards) for connecting parts or devices such as optical components, optical circuit packages, optical circuit devices used for optical communication and optical information processing to each other.

2. Related Art

In connecting plural optical components in an optical circuit package to each other, in connecting plural optical circuit packages to each other, and in connecting optical circuit devices installed with optical circuit packages, an optical connector is disposed at an end of an optical component, an optical circuit package, and an optical circuit devices, which are connected to each other by optical fibers. In this case, since the optical fiber should be arranged with a loose thereof, complicated routing causes optical fibers to interfere with each other and they are entangle in the form of a bird's nest, for example, over the optical circuit package or inside or behind the optical circuit devices. Therefore, large spaces and large amount of labor for routing the optical fibers have been required.

In contrast to the above optical connecting manner for optical fibers, easy methods for solving the above problems by routing optical fibers in a 2-dimensional plane have been proposed. For example, as disclosed in Japanese Patent No. 2574611, an optical interconnection apparatus, in which a routing of optical fibers is secured on a sheet or a substrate on which an adhesive is coated, is proposed. In the production of the optical interconnection apparatus, the optical fibers are routing on a substrate or an optical fiber jacket on which an adhesive is coated so as to form a routing pattern, over which the same material as the substrate is covered so as to form a protecting layer. The routed optical fibers intersecting each other are secured by the protecting layer.

The optical interconnection apparatus having the above structure may be used on an optical circuit package or between optical circuit devices (rack). However, no measures of preventing fire have been provided. In particular, according to recent safety regulations for electrical or electronic apparatuses in recent years, measures of preventing fire, namely, flame resistance, is indispensable. This requirement is essentially the same as for the optical parts. However, in the optical interconnection apparatuses which have been proposed, the structure emphasizes securing and protecting the optical fibers, as described above. Therefore, the adhesive is exposed at the circumferential edge surface of the optical interconnection apparatus, and is feared catching fire from there. Acrylic adhesives (pressure sensitive adhesives) are generally used as the adhesive, and most of these are flammable. Although acrylic adhesives with flame resistance are provided, these adhesives do not have sufficient securing properties for the optical fibers due to addition of a flame retardant agent, so that problems such as dishevelment of the routing pattern of the fibers may readily occur, and are not suitable for practical use.

SUMMARY OF THE INVENTION

The present invention has been made to solve the problems in the above conventional art. An object of the invention is to provide optical interconnection apparatuses, in which plural optical fibers are routed, which have flame resistant maintaining performance and operational efficiency.

The invention provides an optical interconnection apparatus comprising an adhesive layer having a 2-dimensional plane and optical fibers secured on the adhesive layer. The optical fibers are routed on the adhesive layer so as to have at least one of an intersection portion, a bent portion, and a changing portion of fiber pitch, and to have a end portion outwardly projecting from the adhesive layer. The projecting end portion is attached optical connection. At least a portion of the circumferential edge surface of the adhesive layer is covered by a flame resistant material at an end of the optical fiber and in the vicinity thereof.

When fire occurs in an optical circuit device, the fire may be transmitted from one part to another part via optical fibers. According to the optical interconnection apparatus of the invention, since at least a portion of the vicinity of the peripheral edges of the adhesive layer is covered by a flame resistant material at an end of the optical fiber and in the vicinity thereof, it can be inhibited to catch fire from the optical fibers to the adhesive layer. Therefore, flame resistance can be obtained maintaining the performance and the operational efficiency thereof.

It should be noted that "flame resistance" is defined as described below in detail, such that the evaluation of the flame resistance is 94V-2 or more by a "20 mm vertical burning test" specified under the UL94 safety regulation. In particular, when five samples are burned two times under predetermined conditions, the flaming time of each sample at each burning is 30 seconds or less, and the total time of the flaming of five samples in two burning is 250 seconds or less.

In the invention, the adhesive layer is preferably covered by a flexible protecting resin layer for protecting and securing the optical fibers. A edge-dam with flame resistance is preferably provided at a circumference of the adhesive layer, the protecting resin layer is provided inside the edge-dam, and the edge-dam covers the circumferential edge surface of the adhesive layer. The adhesive layer is preferably an acrylic adhesive. The protecting resin layer and the edge-dam are formed from a material of the silicone type with flame resistance. The adhesive layer is preferably provided on a substrate such as a polyimide film with flame resistance. The adhesive in the invention includes one which causes permanent adhesion.

DETAIL EXPLANATION OF THE INVENTION

Preferred embodiments of the invention will be explained with reference to the drawings.

Figure 1:
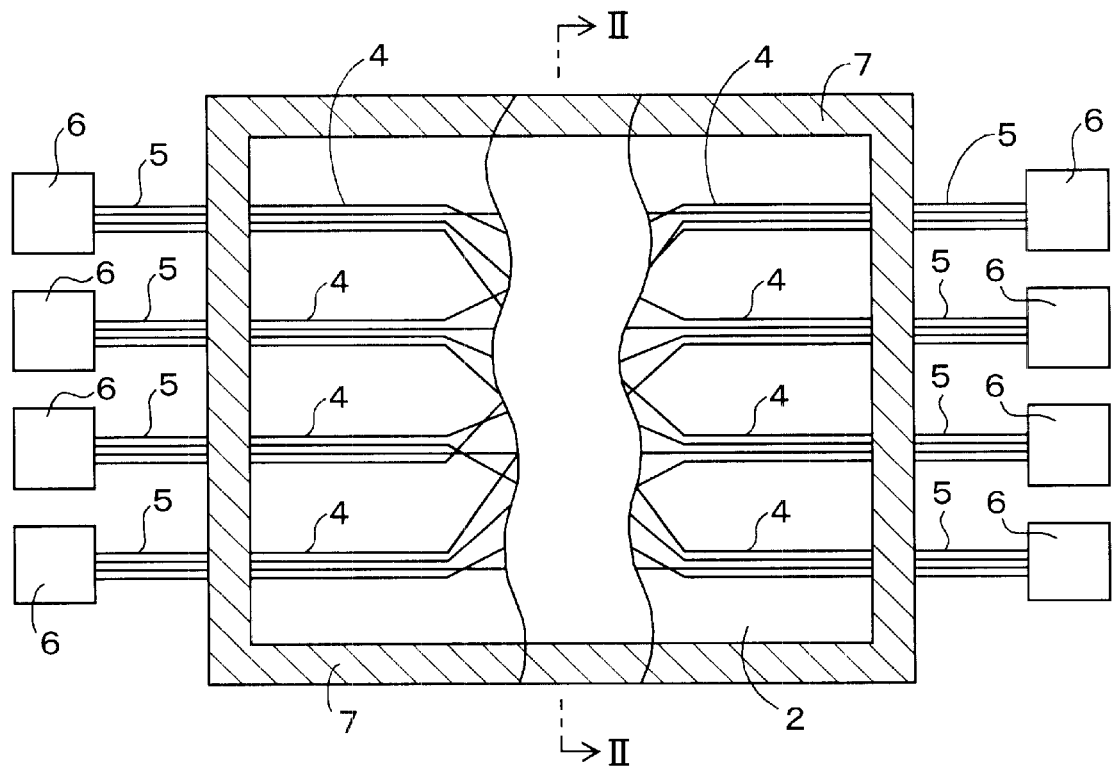
FIG. 1 is a partially cutaway plane view of an optical interconnection apparatus according to a first embodiment of the invention.
Figure 2:
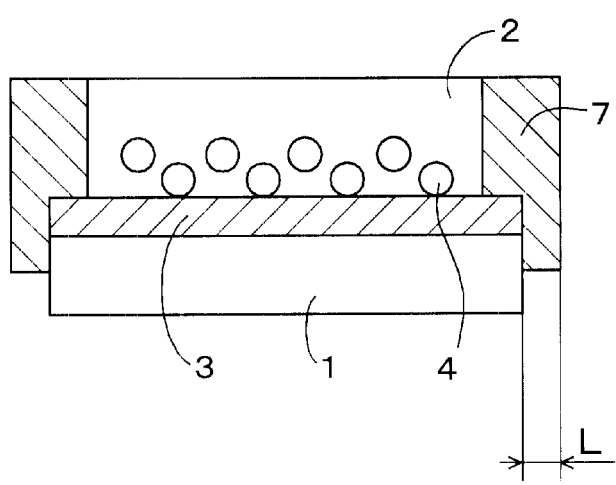
FIG. 2 is a cross section along line II—II in FIG. 1.

FIG. 1 is a partially cutaway plane view of an optical interconnection apparatus according to a first embodiment of the invention, and FIG. 2 is a cross section along line II—II in FIG. 1. As shown in these figures, an adhesive layer 3 is formed on an upper surface of a substrate 1, and plural optical fibers 4 are secured on the upper surface of the adhesive layer 3. The end portion 5 of the optical fibers 4 outwardly project from the adhesive layer 3, and the projecting portions of the fibers 4 are connected to an optical part 6 such as an optical connector.

A edge-dam 7 made from a flame resistant material is formed over the entire circumference of the upper surface of the adhesive layer 3. The inside of the edge-dam 7 is filled with a resin material, so that the optical fibers 4 are secured and protected by a flexible protecting resin layer 2. As shown in FIG. 2, the outer circumference of the edge-dam 7 extends downward so as to reach the substrate 1, whereby the circumferential edge surface of the adhesive layer 3 is completely covered thereby. In order to reliably prevent to catch fire of the adhesive layer 3, the thickness of the edge-dam 7 L (see FIG. 2) is preferably 0.3 mm or more. More preferably the thickness L is 0.5 mm or more, and is further preferably 1.0 mm or more. It should be noted that although the optical fibers 4 are drawn with broken lines on the adhesive layer 3 to simplify the explanation, the optical fibers 4 may actually curve and be led to the opposite optical parts 6. The pitch between the ribbon fibers 4 and the pitch between each fiber 4 on the right in FIG. 1 may differ from that on the left.

Figure 3:
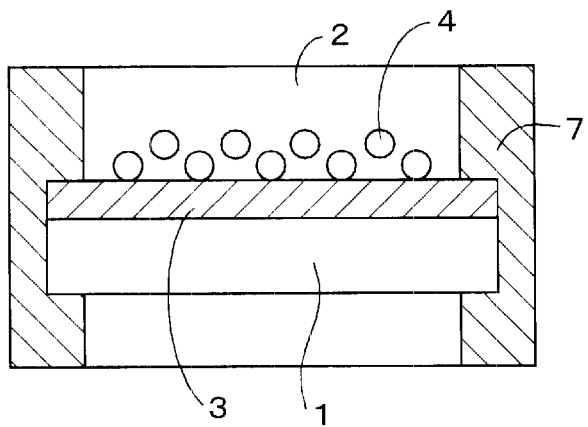
FIG. 3 is a cross section of an optical interconnection apparatus according to a second embodiment of the invention.

FIG. 3 shows a cross section of an optical interconnection apparatus according to a second embodiment of the invention. In the following embodiment, the same numbers corresponding to those in FIGS. 1 and 2 are attached to the same element as in the first embodiment, and explanations thereof will be omitted. The optical interconnection apparatus is different from that in FIG. 2 in structure in that the edge-dam 7 extends below the lower surface of the substrate 1. In the optical interconnection apparatus, not only the circumferential edge surface of the adhesive layer 3 but also the circumferential edge surface of the substrate 1 are completely covered by the edge-dam 7.

Figure 4:
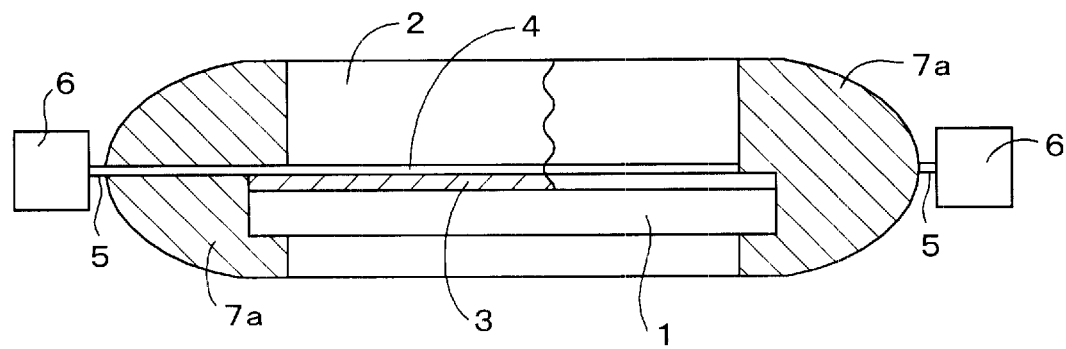
FIG. 4 is a cross section of an optical interconnection apparatus according to a third embodiment of the invention.
Figure 5:
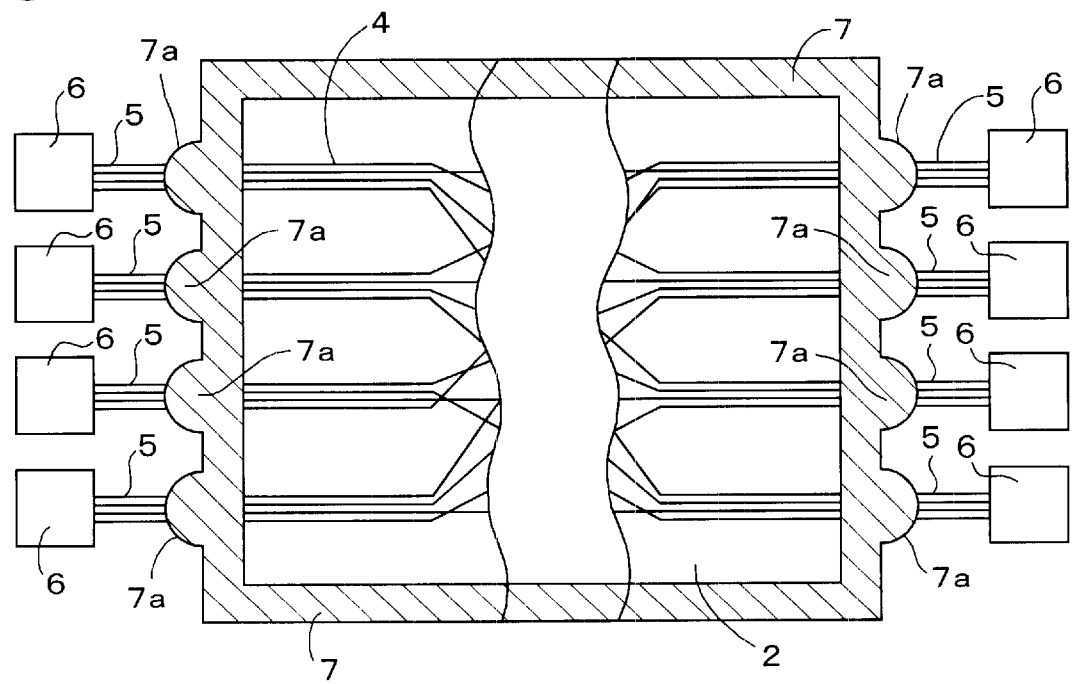
FIG. 5 a partially cutaway plane view of an optical interconnection apparatus according to the third embodiment of the invention.

FIGS. 4 and 5 show a cross section of an optical interconnection apparatus according to a third embodiment of the invention. The optical interconnection apparatus is different from that in FIG. 3 in the structure in which the edge-dam 7a for protecting the end portion 5 of the optical fiber 4 projects from the circumferential outer surface of the edge-dam 7. Since the edge-dam 7a projects in the thickness direction of the edge-dam 7, the flame resistant material thereof is thick. Therefore, if fire is transmitted to the end portion 5, the adhesive layer 3 is not easily caught fire, and the flame resistance can be further improved.

Figure 6:
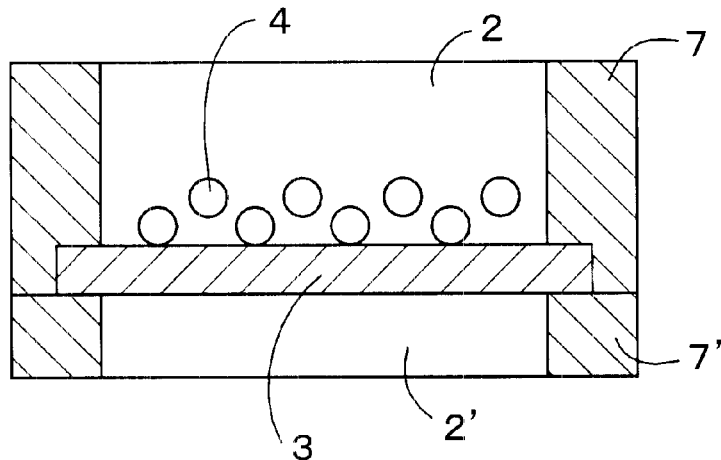
FIG. 6 is a cross section of an optical interconnection apparatus according to a fourth embodiment of the invention.

FIG. 6 shows a cross section of an optical interconnection apparatus according to a fourth embodiment of the invention. The optical interconnection apparatus is different from that in FIG. 3 in structure in that no substrate is used and a flexible protecting resin layer 2' is also provided on the reverse surface thereof. Such an optical interconnection apparatus is produced by the following process. First, an adhesive layer 3 is coated on a release film (not shown), and optical fibers 4 are routed and secured on the adhesive layer 3. Then, a edge-dam 7 is formed so as to cover the entire circumference and the entire circumferential edge surface of the adhesive layer 3, and a resin material is then filled inside thereof so as to form a protecting resin layer 2. Then, the release film is stripped from the adhesive layer 3. Next, a edge-dam 7' is formed on the entire circumference of the reverse surface of the adhesive layer 3, and a flexible resin material is filled inside thereof so as to form a protecting resin layer 2'.

Figure 7:
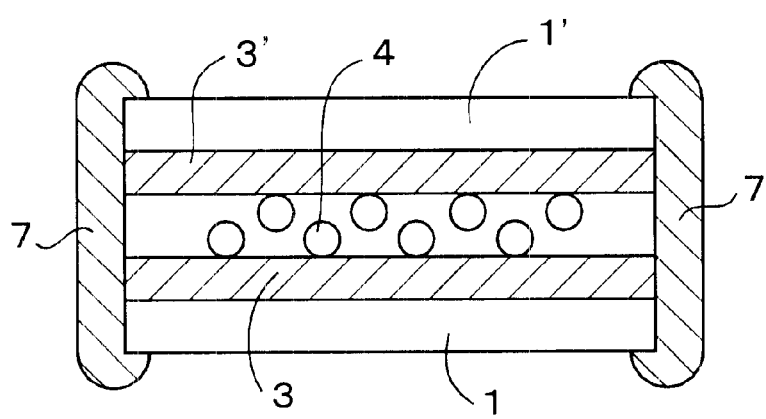
FIG. 7 is a cross section of an optical interconnection apparatus according to a fifth embodiment of the invention.

FIG. 7 shows a cross section of an optical interconnection apparatus according to a fifth embodiment of the invention. As shown in FIG. 7, in the optical interconnection apparatus, plural optical fibers 4 are 2-dimensionally routed on a surface of a substrate 1 via adhesive layer 3. These optical fibers 4 are covered by a substrate 1'. The entire circumferential edge surfaces of the adhesive layers 3 and 3' of the substrates 1 and 1' are covered by a edge-dam 7.

Figure 8:
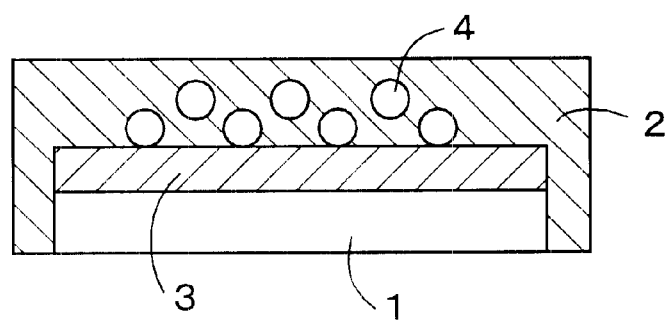
FIG. 8 is a cross section of an optical interconnection apparatus according to a sixth embodiment of the invention.

FIG. 8 shows a cross section of an optical interconnection apparatus according to a sixth embodiment of the invention. As shown in FIG. 8, in the optical interconnection apparatus, plural optical fibers 4 are 2-dimensionally routed on a surface of a substrate 1 via an adhesive layer 3. These optical fibers 4 are protected and secured by a protecting resin layer 2 which covers the entire circumferential edge surfaces of the substrate 1 and the adhesive layer 3.

As mentioned above, the invention does not need the substrate to support the routed optical fibers. Materials for the substrate used in the optical interconnection apparatus are not limited so long as they can form a 2-dimensional plane and have flexibility. For example, glass-epoxy resin composite substrate; polyester film and polyimide film; and members formed into a gel, a rubber, or foam from organic materials such as silicone or urethane; and the like, can be used for the substrate if these materials are used for general electrical parts and electronic parts. The optical interconnection apparatus of the invention need not be flexible according to the object of use, and it may be rigid. For example, substrates made from rigid polymer materials or ceramics can be used, and the shape thereof may be optionally selected. When the optical interconnection apparatus of the invention requires high flame resistance, the substrate is preferably flame resistance, and polyimide films are more preferably used.

The optical fibers routed in the invention are suitably selected according to the object of use of the optical interconnection apparatus. For example, single-mode optical fibers and multi-mode optical fibers produced from materials such as silica or plastic are preferably used. Furthermore, carbon-coated optical fibers are preferably used for the optical fibers.

Any type of adhesive can be used for forming an adhesive layer for routing the optical fibers if the adhesives have adhesion for maintaining the routing of the optical fibers against the tensile strength generated by bending of the routed optical fibers. For example, pressure sensitive adhesives of the urethane type, acrylic type, epoxy type, nylon type, phenol type, polyimide type, vinyl type, silicone type, rubber type, fluorinated epoxy type, fluorinated acrylic type, and the like, thermoplastic adhesives, and thermosetting adhesives can be used. In consideration of ease of routing of the optical fibers, pressure sensitive adhesives and thermoplastic adhesives are preferably used, and adhesives of the acrylic type are more preferably used.

In the invention, the protecting resin layer is provided in such as the above to secure and protect the routed optical fibers and to supply further flame resistance to the optical interconnection apparatus. The protecting resin layer can be provided on at least one surface of the optical interconnection apparatus so as to cover the entire surface thereof. Alternatively, a edge-dam is provided at the circumference of the optical interconnection apparatus, and a resin material is embedded thereinto so as to form a protecting resin layer. In this case, in order to form the protecting resin layer, first, a edge-dam is provided at the entire circumference or in the vicinity thereof on a supporting member such as a substrate with a width in which the edge-dam projects from the circumference of the substrate, and subsequently, the protecting resin layer is provided such that the entire surface of the substrate and the adhesive layer is covered by the protecting resin layer. Alternatively, the protecting resin layer may be formed so as to cover the entire surface of the optical interconnection apparatus while maintaining the function of the edge-dam. The protecting resin layer formed in such a manner inhibits burning of the optical interconnection apparatus, so that ignition of the adhesive layer is prevented, and the optical interconnection apparatus can be flame resistant. By forming the edge-dam or the protecting resin layer also on the optical fiber projecting from the optical interconnection apparatus, the optical fiber can also be flame resistant.

Materials forming the edge-dam are not limited as long as they are materials having flame resistance, and they are suitably selected according to the object of use of the optical interconnection apparatus. In particular, flame resistant sealing materials in which a flame retardant agent is added in a resin, such as the silicone type, epoxy type, urethane type, and acrylic resin, are preferably used. Flame retardant agents added to obtain flame resistance are not limited. As flame retardant agents, any such agents can be used. For example, the bromine type, such as tetrabromo bisphenol A and 2,2-bis (4-hydroxy-3,5-dibromophenyl) propane, the halogen type compounds of the chlorine type used with chlorinated paraffin, inorganic type compounds such as red phosphorus, tin oxides, antimony trioxides, aluminum hydroxides, magnesium hydroxides, and phosphorus type compounds such as ammonium phosphate, tricresylic phosphate, tris (β-chloroethyl) phosphate, phosphoric acid ester, and phosphorus compound including nitrogen can be mentioned. In order to improve the function of flame resistance, two or more of the above mentioned flame retardant agents are used together.

The addition amount of the above flame retardant agent with respect to 100 parts by weight of the material of the silicone type, epoxy type, urethane type, or acrylic resin type as a base compound is suitably selected according to the kind of flame retardant agent and the object of flame resistance. Generally, the addition amount is in a range of 1 to 100 parts by weight, preferably is in a range of 5 to 70 parts by weight, and more preferably is in a range of 10 to 50 parts by weight.

In the invention, since the aging stability is improved and the amount of smoke and noxious gas emitted during burning is reduced, flame retardant materials of the silicone type including compounds of the platinum group are preferably used. In general, materials of the silicone type have specific flame resisting functions, and by adding a small amount of a compound of platinum group, decomposition of the polymer and gasification thereof can be inhibited, whereby self-extinguishing properties can be obtained.

As compounds of the platinum group, compounds including elements of the platinum group such as platinum, palladium, and rhodium are suitably used. For example, compounds of the platinum group such as platinochloride, alcohol degenerated platinochloride, complexes of platinum and olefins, complexes of platinum and ketones, complexes of platinum and vinyl siloxane, compound in which platinum is held by supporting material such as aluminum oxides or silica, and compounds of the palladium group such as a mixture of tetrakis (triphenyl phosphine) palladium and triphenyl phosphine, and compounds of the rhodium group may be mentioned.

The addition amount of the compound of the platinum group with respect to 100 parts by weight of the material of the silicone type is preferably in a range of 0.01 to 1000 ppm of the element weight of platinum, palladium, or rhodium, and more preferably is in a range of 0.5 to 200 ppm. When the addition amount of the compound of the platinum group is less than 0.01 ppm, the obtained flame resistance is insufficient. Even if the addition amount of the compound is more than 1000 ppm, flame resistance is not further improved, and the heat resistance is deteriorated.

The flame resistance can be further improved by using flame retardant aids such as silica, alumina, titanium oxides, iron oxides, carbon, and metallic carbonates together with the compounds of the platinum group. The addition amount of the flame retardant aid with respect to 100 parts by weight of the material of the silicone type is preferably in a range of 1 to 200 parts by weight when the aids are other than carbon. When the addition amount of the flame retardant aid is less than 1 part by weight, the effect of the addition is insufficient. When the addition amount of the flame retardant aid is more than 200 parts by weight, physical characteristics are deteriorated such that hardened portion produced thereby may be brittle. The more preferable addition amount of the flame retardant aid other than carbon is in a range of 5 to 150 parts by weight, and more preferably is in a range of 10 to 100 parts by weight. When the aid is carbon, the addition amount thereof is preferably in a range of 0.01 to 30 parts by weight under the same reason as the above. The more preferable addition amount of the aid is in a range of 0.05 to 20 parts by weight, and more preferably is in a range of 0.1 to 10 parts by weight The resin materials used for the protecting resin layer are not limited. For example, organic materials in a gel or in a rubber, curing resins having flexibility such as ultraviolet curing resins, electron beam curing resins, and thermosetting resins, and thermoplastic resins having flexibility are used. In particular, as organic materials in a gel, gels of the silicone type, gels of the acrylic type, and a gel of the fluorinated resin type may be mentioned. As organic materials in a rubber, rubbers of the silicone type, rubbers of the urethane type, rubbers of the acrylic type, rubbers of the fluorinated type, rubbers of the ethylene-acrylic type, SBR, BR, NBR, and rubbers of the chloroprene type may be mentioned. As curing resins with flexibility, epoxy resins, silicone resins, and activated energy beam curing resins may be mentioned. As thermoplastic resins with flexibility, polyvinyl acetate, acrylic resins such as methacrylate ethyl resin, and resins forming adhesives of hot-melt type such as vinylidene chloride resin, polyvinyl butyral resin, and polyamide resin may be mentioned.

In order to improve flame resistance of the optical interconnection apparatus, the resin material for the protecting resin layer also have flame resistance preferably. In this case, flame retardant agents can be suitably selected according to the object of use. For example, the aforementioned bromine type such as tetra bromobisphenol A and 2, 2-bis (4-hydroxy-3,5-dibromo phenyl) propane, the halogen type compounds of the chlorine type used with chlorinated paraffin, inorganic type compounds such as red phosphorus, tin oxides, antimony oxides, aluminum hydroxides, magnesium hydroxides, and phosphorus type compounds such as ammonium phosphate, tricresylic phosphate, tris (β-chloroethyl) phosphate, phosphoric acid ester, and phosphorus compound including nitrogen can be mentioned, and any type of flame retardant agents can be used. In order to improve the function of flame resistance, two or more of the aforementioned flame retardant agents are used together.

The addition amount of the above flame retardant agent with respect to 100 parts by weight of the aforementioned material as a base compound is suitably selected according to the kind of flame retardant agent and the object of flame resistance. Generally, the addition amount is in a range of 1 to 100 parts by weight, preferably is in a range of 5 to 70 parts by weight, and more preferably is in a range of 10 to 50 parts by weight.

In the invention, since the aging stability is improved and the amount of smoke and noxious gas emitted during burning is reduced, flame retardant materials of the silicone type including compounds of the platinum group is preferably used for the protecting resin layer as well as that of the edge-dam.

As compounds of the platinum group, compounds of the platinum group such as platinochloride acid, alcohol degenerated platinochloride acid, complexes of platinum and olefins, complexes of platinum and ketones, complexes of platinum and vinyl siloxane, compounds in which platinum is held by supporting material such as aluminum oxides or silica, and compounds of the palladium group such as a mixture of tetrakis (triphenylphosphine) palladium and triphenyl phosphine, and compounds of the rhodium group may be mentioned.

The addition amount of the compound of the platinum group with respect to 100 parts by weight of the material of the silicone type is preferably in a range of 0.01 to 1000 ppm of the element weight of platinum, palladium, or rhodium, and more preferably is in a range of 0.5 to 200 ppm.

The flame resistance can be further improved by using flame retardant aids such as silica, alumina, titanium oxides, iron oxides, carbon, and metallic carbonates together with the compounds of the platinum group. The addition amount of the flame retardant aid with respect to 100 parts by weight of the material of the silicone type is in a range of 1 to 200 parts by weight, preferably is in a range of 5 to 150 parts by weight, and more preferably is in a range of 10 to 100 parts by weight when the aids are other than carbon, and is in a range of 0.01 to 30 parts by weight, preferably is in a range of 0.05 to 20 parts by weight, and more preferably is in a range of 0.1 to 10 parts by weight when the aid is carbon.

In the invention, as mentioned above, the protecting resin layer may not be provided, but a substrate or a substrate with an adhesive layer on the routed optical fibers on the adhesive layer as mentioned above may be provided so as to protect and secure the optical fibers. In this case, the circumferential edge surface of the adhesive layer may be exposed, and the circumference of the supporting member such as a substrate may be covered by a flame retardant material so as to cover the exposed portion, and thus the object of the invention can be accomplished. In this case, flame retardant materials are not limited. For example, the aforementioned resin materials used in the protecting resin layer or edge-dam are preferably used.

Next, the process for producing the optical interconnection apparatus of the invention will be explained in further detail. For example, when a substrate is used, the aforementioned adhesive is directly coated, or alternatively, is dissolved in a solvent and is coated on the surface of the substrate so as to form an adhesive layer. The thickness of the adhesive layer is suitably selected according to the diameter of the optical fibers which are routed thereon. The thickness of the adhesive layer is generally in a range of 1 µm to 1 mm, preferably are in a range of 5 to 500 µm, and more preferably are in a range of 10 to 300 µm.

The optical fibers are routed in a desired pattern on the adhesive layer. The routing of the optical fibers is made such that the plural optical fibers have at least one of an intersecting portion, a bent portion, and a changing portion of the fiber pitch. In this manner, the end portions of the optical fibers are outwardly projecting from the substrate so as to be attached to optical connectors, and the like. It should be noted that in the case in which the changing portion of the fiber pitch exists, for example, the routings of the fibers at an input port and an output port are the same as each other, but the pitches of the fibers differ from each other. In this case, for example, the optical fibers are routed at a pitch of 500 µm in the input port side, the optical fibers are routed at a pitch of 250 µm in the output port side.

In order to provide the protecting resin layer for protecting and securing the optical fibers routed such as in the above, first, a edge-dam is provided on the circumference of the adhesive layer such that a portion thereof projects therefrom; then, a resin material for forming the protecting resin layer is filled and cured therein. The edge-dam preferably covers the entire circumferential edge surface of the adhesive layer on the substrate. Only a edge-dam is further provided to the reverse surface of the substrate so as to cover the circumferential edge surface of the substrate, if necessary. The resin material filled inside the edge-dam can be formed into the protecting resin layer by several methods. For example, a method in which a resin material is dissolved in a suitable solvent to form a coating material, which is dropped and dried inside the edge-dam, a method in which a resin material is hot melt, and is dropped and solidified inside the edge-dam, a method in which a solid resin material is filled inside the edge-dam, and the resin material or the entire optical interconnection apparatus is heated, so that the resin material is melt and solidified, and a method in which a liquid resin material is filled inside the edge-dam, and is solidified by ordinary temperature curing, thermosetting, or humidity curing can be applied.

The thickness of the protecting resin layer for securing and protecting the routed optical fibers is suitably selected according to the diameter of the optical fibers and the number of overlapped optical fibers so that the optical fibers can be protected and be secured. In general, thickness of (diameter of optical fiber)×(number of grouped optical fibers) or more is necessary. The thickness of the protecting resin layer where the optical fibers are not routed is suitably selected according to the object of use of the optical interconnection apparatus in a range in which the rigidity of the film-shaped substrate is facilitated. In general, the thickness of that portion is set in a range of 1 µm to 5 mm, preferably in a range of 10 µm to 1 mm, and more preferably in a range of 30 to 500 µm.

In the case of the invention in which the optical interconnection apparatus does not include a substrate, the 2-dimensionally routed optical fibers are embedded in the protecting resin layer, and are secured and protected therein. In the producing process in this case, for example, a release film is used as a temporary supporting member, and an adhesive layer is formed on the release film similarly as in the above. Optical fibers are routed on the adhesive layer such that the end portion thereof projects therefrom, and a edge-dam is formed on the entire circumference of the adhesive layer such that a portion of the edge-dam projects therefrom. A resin material is filled inside the edge-dam so as to form a protecting resin layer, whereby the optical fibers are secured and protected. Then, the release film is removed, and by using the resin material which is the same as or different from that of the above-mentioned protecting resin layer, a protecting resin layer is formed on the exposed adhesive layer similarly as in the above. It should be noted that optical fibers may be routed again on the exposed adhesive layer from which the release film is removed, and a protecting resin layer may be formed thereon while the optical fibers are embedded therein similarly as in the above.

In the optical interconnection apparatus of the invention produced as in the above, the projecting end portion of the optical fiber is connected to an optical part such as optical connector or optical module. For example, the end portion of the optical fiber, which is treated to attach to an optical connector, is attached to an optical connector, alternatively, an end face of an optical fiber attached in an optical connector is attached to the end face of the optical fiber projecting from the optical interconnection apparatus by arc-fusion-spliced. The optical connectors attached to the optical interconnection apparatus of the invention are not limited, but single-fiber or multi-fiber compact optical connectors are preferably used. For example, MPO optical connectors, MT optical connector, MU optical connectors, FPC optical connectors (NTT R&D, Vol. 45, No. 6, P589), and V-grooved part, which are used for optical interconnecting, may be mentioned. Methods for attaching the optical connectors are not limited any more.

EXAMPLES

The present invention will be explained in more detail with reference to examples of the invention. It should be noted that the scope of the invention is not limited by the following examples.

Example 1

100 parts by weight of 30% acetic ethyl solution of acrylic resin consisting of n-butylacrylate/methylacrylate/acrylic acid/2-hydroxyethyl methacrylate copolymer (mixing ratio: 82/15/2.7/0.3) was added and mixed with 1.0 part by weight of Colonate L (trade name, produced by Japan Polyurethane Industry Co., Ltd.), and an acrylic adhesive coating material was obtained. The coating material was coated on a surface of a polyimide film with a thickness of 125 $\mu$m such that the thickness thereof after drying was 100 $\mu$m, and a substrate sheet (size: 120 mm×100 mm), on which an adhesive layer was formed, was prepared. Optical fibers (produced by the Furukawa Electric Co., Ltd., diameter: 250 $\mu$m) are routed on the adhesive layer of the substrate for each a port (portion where the optical fibers were led out from the optical interconnection apparatus) in the following manner. That is, four optical fibers were routed in parallel at an pitch of 250 $\mu$m, and four ports (each port consists of four optical fibers) were routed at each long side of the polyimide film at an pitch of 30 mm. Each optical fiber was routed from one long side from another long side of the polyimide film. In the routing of the optical fibers between the ports, the intersecting portions were routed so that the maximum number of the overlapped fibers was three.

Then, a edge-dam with a width of 3 mm (1 mm of projecting width from the polyimide film) and a height of 1 mm was formed on the circumference of the adhesive layer on which the optical fibers were routed using a flame resistant silicone rubber coating material (produced by Toshiba Silicone Co., Ltd.; trade name: TSE3843) so as to cover the entire circumferential edge surface of the adhesive layer. Next, a flame resistant silicone rubber coating material (produced by Dow Corning Toray Silicone Co., Ltd.; trade name: HC1100) was dropped inside the edge-dam, and the silicone rubber was cured at a temperature of 25° C. for 24 hours so as to form a protecting resin layer, whereby the optical fibers were secured by the protecting resin layer, and an optical circuit board as shown in FIG. 2 with a thickness of 1.2 mm was thus manufactured.

Next, the optical fibers led out from the optical interconnection apparatus were attached to a four-fibers MT connector, and the optical losses of the entire optical fibers were measured. The measured optical losses including that attached the optical connector were 0.4 dB or less. The optical circuit board thus manufactured was conducted to a high temperature and high humidity test in which the sample was maintained in 75° C. and a humidity of 90% for 5000 hours, and a heat cycle test in which the temperature was varied from −40° C. to 75° C. 500 times. As a result, the variation or change of the optical loss was 0.6 dB or less, and this demonstrated that the optical circuit board was satisfactory for an optical interconnection apparatus.

Example 2

The substrate sheet formed with the adhesive layer according Example 1 was cut to a size of 13 mm×125 mm. Four optical fibers (produced by the Furukawa Electric Co., Ltd.; diameter: 250 $\mu$m) are straightly routed on the adhesive layer of the substrate sheet from one long side to another long side of the substrate at an pitch of 250 $\mu$m, and the ends of the optical fibers were led out from the substrate sheet for a length of 20 mm.

Then, a edge-dam with a width of 3 mm (1 mm of projecting width from the polyimide film) and a height of 1 mm was formed on the circumference of the adhesive layer on which the optical fibers were routed using a flame resistant silicone rubber coating material (produced by Toshiba Silicone Co., Ltd.; trade name: TSE3843) so as to cover the entire circumferential edge surface of the adhesive layer. Next, a silicone rubber coating material (produced by Toshiba Silicone Co., Ltd. trade name: TSE399) was dropped inside the edge-dam, and the silicone rubber was cured at a temperature of 25° C. for 24 hours so as to form an protecting resin layer, and a sample for a burning test having a edge-dam as shown in FIG. 2 with a thickness of 1.2 mm was thus manufactured.

Example 3

A sample for a burning test having a edge-dam as shown in FIG. 4 was manufactured under the same conditions as in Example 2, except that a edge-dam was formed not only at the circumferential edge face of the adhesive layer, but also at the led out portion of the optical fibers so as to form a projection with a width of 1.5 mm, a length of 5 mm, and a height of 1 mm.

Example 4

A sample for a burning test having a edge-dam as shown in FIG. 4 was manufactured under the same conditions as in Example 3, except that a flame resistant silicone rubber coating material (produced by Dow Corning Toray Silicone Co., Ltd.; trade name: SE9178) for the edge-dam, and a flame resistant silicone rubber coating material (produced by Dow Corning Toray Silicone Co., Ltd.; trade name: SE1816CV) for a resin material which forms the protecting resin layer were used, and was dropped inside the edge-dam and was cured at 120° C. for 30 minutes so as to form a protecting resin layer.

Example 5

In the sample manufactured in Example 4, a edge-dam was also formed on the reverse surface of the polyimide film, and the circumferential edge surface of the polyimide film and the optical fibers were wrapped by the edge-dam. In Example 5, a flame resistant silicone rubber coating material (produced by Dow Corning Toray Silicone Co., Ltd.; trade name: SE9590) was used for the reverse edge-dam, which had a width of 3 mm (1 mm of projecting width from the polyimide film) and a thickness of 0.5 mm, and a sample for a burning test having a edge-dam as shown in FIG. 3 was manufactured.

Example 6

In the sample manufactured in Example 2, a polyimide film having the routed optical fibers on which no edge-dam and no protecting resin layer was provided, and a polyimide film of the same size which was coated with an acrylic adhesive layer with a thickness of 100 μm were laminated to each other in a vacuum. Then, the entire circumferential edge surface, at which the adhesive layer was exposed, was coated by a flame resistant silicone rubber coating material (produced by Dow Corning Toray Silicone Co., Ltd.; trade name: SE9178), the silicone rubber was cured at 25° C. for 24 hours, and a sample for a burning test having a edge-dam as shown in FIG. 7 was manufactured.

Example 7

In the sample manufactured in Example 2, the adhesive layer of the polyimide film, which was routed with the optical fibers on which no edge-dam and no protecting resin layer was provided, was coated by a flame resistant silicone rubber coating material (produced by Toshiba Silicone Co., Ltd.; trade name: TSE3843) such that the entire circumferential edge surface of the adhesive layer and the entire surface on which the optical fibers were routed were coated, the silicone rubber was cured at 25° C. for 24 hours, and a sample for a burning test having a edge-dam as shown in FIG. 8 was manufactured.

Comparative Example 1

A protecting resin layer was formed under the same conditions as in Example 2 except that a nonwoven fabric formed of polypropylene fibers (produced by Tonen Tapyrus, trade name: P100SW-00X) as a edge-dam having a width of 5 mm and a height of 1 mm was formed on the circumference of the adhesive layer so as not to project from the edge surface, and thus a sample for a burning test was manufactured.

Comparative Example 2

A protecting resin layer was formed under the same conditions as in Example 2 except that a flammable silicone rubber coating material (produced by Dow Corning Toray Silicone Co., Ltd.; trade name: SE9186) was used for a edge-dam, and thus a sample for a burning test was manufactured.

Comparative Example 3

In Example 6, the coating by the flame resistant silicone rubber to the circumferential edge surface of the polyimide films which are laminated each other was not performed, and a sample for a burning test was manufactured.

Burning Test

Burning tests were performed according to the "20 mm vertical Burning Test" in UL94V of the UL Regulations. The burning test corresponds to ASTM D3801, IEC 707, or ISO 1210. The specific manner of the test is as follows.

The samples manufactured in Example 2 and subsequent examples were cut to lengths of 125 mm and in widths of 13 mm, and five samples for the burning test with respect to each example were prepared. The 6 mm lengthened portion from the upper end of the sample was clamped so as to hang it. A 100% absorbent cotton with a thickness of 5 mm and a square size of 50 mm and a weight of 0.07 g was disposed below 300 mm from the lower end surface of the sample. In this condition, the upper end of a flame of a gas burner was positioned 10 mm just below the lower end surface of the sample, and this condition was maintained for 10 seconds, so that the sample was burned. Methane gas was used for the fuel of the gas burner, and the flow rate thereof was 105 ml/min. Conditions were adjusted so that a blue flame was generated in a length of 20 mm from the upper surface of the gas burner. The time $t_1$ from the initiation of flaming of the sample to extinguishing of the flame was measured. After extinguishing of the flame, the sample was burned as the same manner as the above, and the time $t_2$ from the re-initiation of flaming of the sample to extinguish of the flame was measured. The above burning test was performed on five samples with respect to the Examples and the Comparative Examples. The total flaming time of the five samples and the maximum flaming time in each Example (Comparative Example) were recorded. The flame resistances were evaluated according to UL94, and the results are shown in Table 1.

The evaluations according to UL94 are shown in Table 2. In Table 2, 94V-2 is distinguished from 94V-1 by the absorbent cotton being ignited by a flaming material dropped from the sample.

TABLE 1

| | Total Flaming in Second [($t_1 + t_2$) × 5] | Maximum Flaming in Second [Maximum Value of $t_1$ or $t_2$] | Evaluation in UL94 |
|---|---|---|---|
| Example 2 | 33 | 8 | V-0 |
| Example 3 | 28 | 6 | V-0 |
| Example 4 | 28 | 6 | V-0 |
| Example 5 | 18 | 4 | V-0 |
| Example 6 | 25 | 6 | V-0 |
| Example 7 | 22 | 6 | V-0 |
| Compalative Example 1 | 280 | 60 | Failure |
| Compalative Example 2 | 280 | 60 | Failure |
| Compalative Example 3 | 280 | 60 | Failure |

TABLE 2

| Evaluation of Flame Resistance | 94V-0 | 94V-1 | 94V-2 |
|---|---|---|---|
| Flaming Time of Sample | 10 Seconds or less | 30 Seconds or less | 30 Seconds or less |
| Total Flaming Time | 50 Seconds or less | 250 Seconds or less | 250 Seconds or less |

As shown in Table 1, in the optical interconnection apparatuses of the invention, the evaluations for flame resistance of all samples were 94V-0, and they demonstrated superior flame resistance. That is, in the Example of the invention, even if the optical fibers were caught fire by the gas burner, the burning was extinguished before the adhesive layer being caught fire. In contrast, in the Comparative Examples, the adhesive layer was caught fire via the optical fibers, and the burning thereof continued for a long time (the total flaming time exceeded 250 seconds), and the none of the samples met even 94V-1, and they failed. It should be noted that "flame resistant material" in the invention is defined as the evaluation of flame resistance in a burning test is 94V-2 or more, preferably 94V-1 or more, and more preferably 94V-0.

As mentioned in the above, in the optical interconnection apparatus of the invention, by covering at least a portion of the circumferential edge surface of the adhesive layer by a flame resistant material at an end of the optical fiber and in the vicinity thereof, the optical interconnection apparatus can be flame resistant without using flame resistant materials for all the components.

What is claimed is:

1. An optical interconnection apparatus comprising:
   an adhesive layer having a 2-dimensional plane; and
   plural optical fibers secured on the adhesive layer;
   wherein the optical fibers are routed on the adhesive layer so as to have at least one of an intersection portion, a bent portion, and a changing portion of fiber pitch, and to have a end portion outwardly projecting from the adhesive layer;
   the projecting end portion is used for optical interconnection; and
   an edge-dam with flame resistance is provided at a circumference of the adhesive layer, the outer circumference of the edge-dam extends downward so as to reach a substrate, whereby the circumferential edge surface of the adhesive layer is completely covered.

2. An optical interconnection apparatus according to claim 1, wherein a flexible protecting resin layer is provided on the surface of the adhesive layer inside the edge-dam for protecting and securing the optical fibers.

3. An optical interconnection apparatus comprising:
   an adhesive layer having a 2-dimensional plane; and
   plural optical fibers secured on the adhesive layer;
   wherein the optical fibers are routed on the adhesive layer so as to have at least one of an intersection portion, a bent portion, and a changing portion of fiber pitch, and to have an end portion outwardly projecting from the adhesive layer;
   the projecting end portion is used for optical interconnection; and
   a flexible protecting resin layer with flame resistance is provided on the surface and at a circumference of the adhesive layer, the outer circumference of the flexible protecting resin layer extends downward so as to reach a substrate, whereby the circumferential edge surface of the adhesive layer is completely covered.

4. An optical interconnection apparatus according to claim 1, wherein the adhesive layer is an acrylic adhesive.

5. An optical interconnection apparatus according to claim 2, wherein the adhesive layer is an acrylic adhesive.

6. An optical interconnection apparatus according to claim 3, wherein the adhesive layer is an acrylic adhesive.

7. An optical interconnection apparatus according to claim 2, wherein the protecting resin layer is formed from a material of the silicone type with flame resistance.

8. An optical interconnection apparatus according to claim 3, wherein the flexible protecting resin layer is formed from a material of the silicone type with flame resistance.

9. An optical interconnection apparatus according to claim 5, wherein the protecting resin layer is formed from a material of the silicone type with flame resistance.

10. An optical interconnection apparatus according to claim 1, wherein the edge-dam is formed from a material of the silicone type with flame resistance.

11. An optical interconnection apparatus according to claim 4, wherein the edge-dam is formed from a material of the silicone type with flame resistance.

12. An optical interconnection apparatus according to claim 7, wherein the edge-dam is formed from a material of the silicone type with flame resistance.

13. An optical interconnection apparatus according to claim 9, wherein the edge-dam is formed from a material of the silicone type with flame resistance.

14. An optical interconnection apparatus according to claim 8, wherein the adhesive layer is provided on a substrate with flame resistance.

15. An optical interconnection apparatus according to claim 12, wherein the adhesive layer is provided on a substrate with flame resistance.

16. An optical interconnection apparatus according to claim 13, wherein the adhesive layer is provided on a substrate with flame resistance.

17. An optical interconnection apparatus according to claim 14, wherein the substrate is a polyimide film.

18. An optical interconnection apparatus according to claim 15, wherein the substrate is a polyimide film.

19. An optical interconnection apparatus according to claim 16, wherein the substrate is a polyimide film.

20. An optical interconnection apparatus according to claim 17, wherein the substrate is a polyimide film.

* * * * *